Dec. 22, 1970  V. L. WAINWRIGHT  3,549,345
METHOD OF PRESSING GLASS ARTICLES
Filed April 1, 1968  3 Sheets-Sheet 2

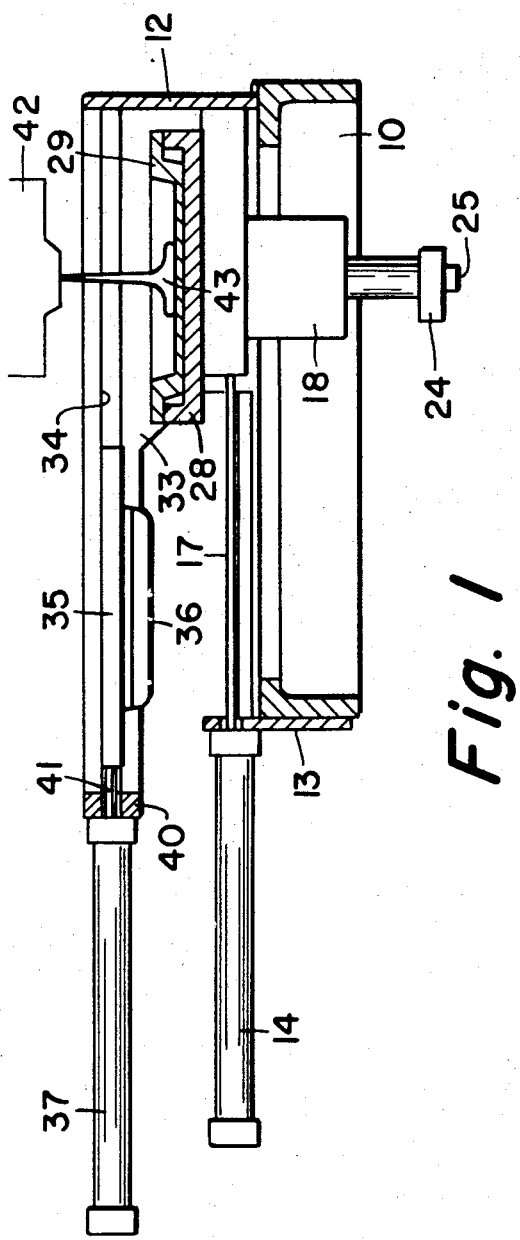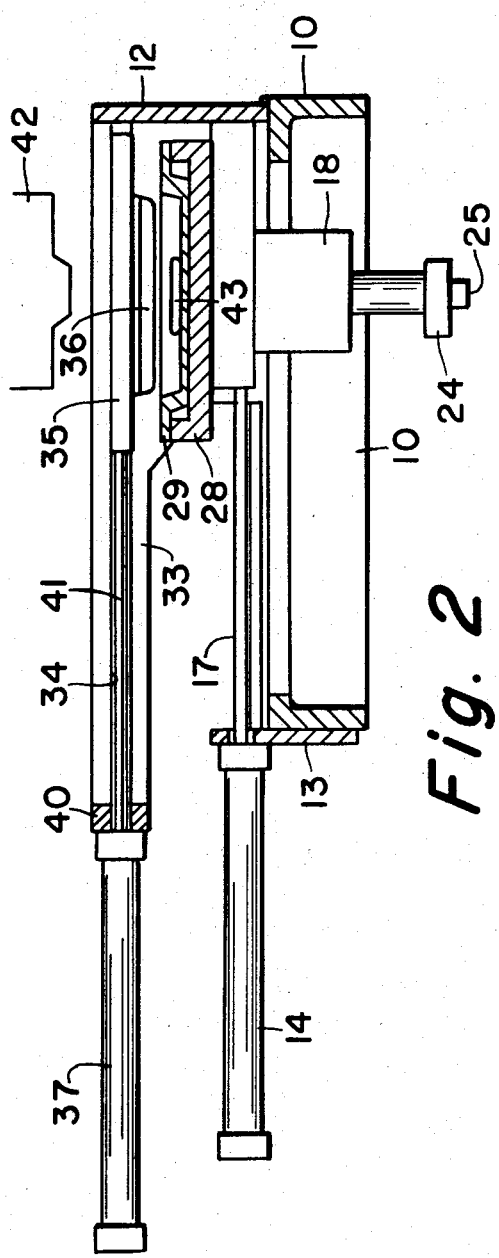

INVENTOR.
Vernon L. Wainwright
BY
ATTORNEY

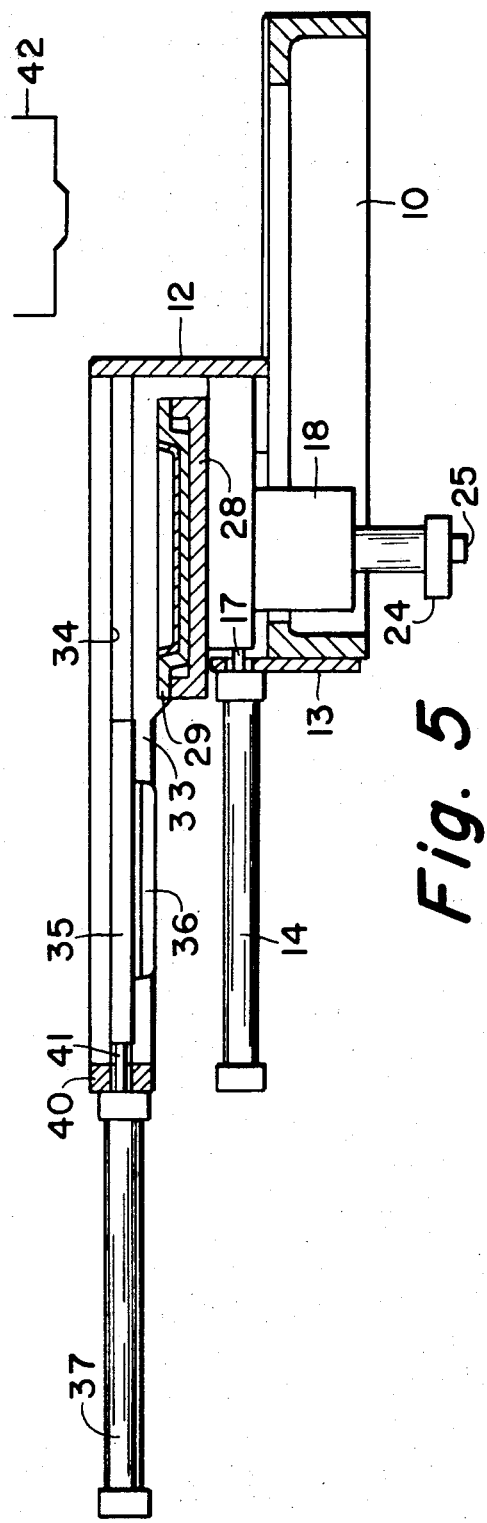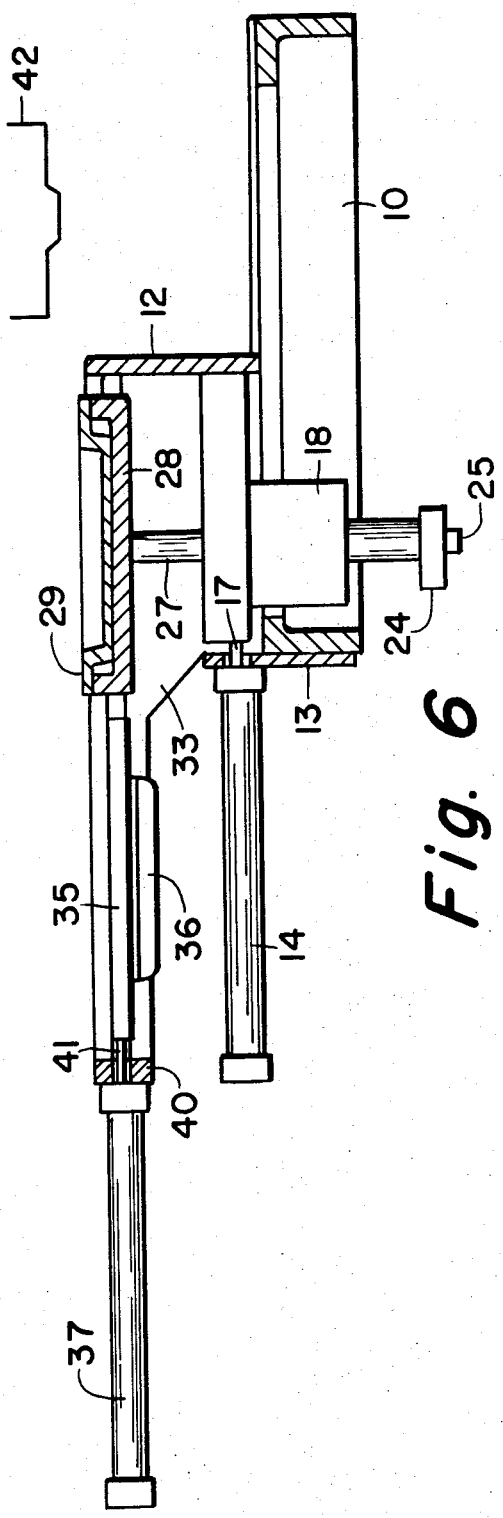

United States Patent Office 3,549,345
Patented Dec. 22, 1970

3,549,345
METHOD OF PRESSING GLASS ARTICLES

Vernon L. Wainwright, Albion, Mich., assignor to Corning Glass Works, Corning, N.Y., a corporation of New York
Filed Apr. 1, 1968, Ser. No. 717,783
Int. Cl. C03b 11/00
U.S. Cl. 65—66    4 Claims

ABSTRACT OF THE DISCLOSURE

A method of pressing glass articles from molten glass wherein a charge of molten glass is delivered from a fixed glass delivery orifice into a mold, while the mold is in a down position. A plunger is moved above the mold and below the fixed orifice; the mold being maintained stationary in the same down position. The charge is then press-formed into a glass article.

BACKGROUND OF THE INVENTION

In the past it has been known to press-form thin glass articles by loading a raised mold, lowering the mold so as to facilitate the positionment of a plunger thereabove, and finally pressing the article therebetween. This known type of operation is illustrated in the prior art by U.S. Pat. Nos. 3,291,588 and 3,334,985.

As indicated in the prior art, it was deemed necessary to load the molds with the glass in a very fluid state, particularly when press-forming articles from glasses having a rather short working range. That is, it was felt that by delivering a high temperature, and accordingly low viscosity charge to the mold, the charge would tend to remain in its working range long enough to manipulate the forming members and thereby facilitate the pressing of relatively thin articles. However, in order to deliver such fluid glass to the mold without splashing, it was necessary to raise the mold to a position immediately below the delivery orifice. The raised mold then had to be lowered in order to facilitate the positionment of a pressing plunger thereabove, which resulted in a time delay materially affecting not only the viscosity and pressability of the charge, but also the thickness of the finished article formed therefrom.

My invention reduces the operating cycle utilized in the prior art by eliminating two operational steps previously deemed to be necessary, and accordingly facilitates the press forming of glass articles, particularly from glass having a relatively short working range.

SUMMARY OF THE INVENTION

The present invention relates to a method of forming glass articles by pressing a molten charge in the same vertical plane in which it was delivered to a forming member. The method is further characterized by the fact that once the charge is delivered to a mold member, it is maintained stationary and neither moves vertically nor laterally, until the actual pressing operation wherein relative vertical movement is effected between the mold member and the plunger to press-form the article therebetween.

Briefly, the above objectives are accomplished by delivering a charge of molten glass vertically-downwardly into a mold positioned below a glass discharge orifice, positioning a plunger in vertical alignment above the mold while maintaining such mold stationary, and then press-forming the charge into a glass article by effecting relative vertical movement between the plunger and mold member. Preferably the pressing action is accomplished by maintaining the plunger in a stationary position and vertically raising the mold member into pressing engagement therewith. After the article is press-formed the mold and plunger, while still in a closed relationship, may be moved laterally in unison from beneath the delivery orifice. The mold member is then lowered to facilitate the horizontal withdrawal of the plunger so that the newly formed article may be removed from the mold. If desired, takeout may be facilitated by raising the mold to its upermost position, from which it must be subsequently lowered preparatory to receiving another charge when positioned beneath the glass discharge orifice.

Since the pressing operation is no longer delayed by the time necessary to index the mold downwardly, as required by the prior art, it is now possible to charge the mold with higher viscosity glass than that deemed necessary by the prior art. That is, with the present invention the time element is such that higher viscosity glasses of up to about 2300 poises, will still be within their working ranges and have sufficient fluidity to facilitate the press-forming of relatively thin ware articles.

It has thus been an object of the present invention to provide an improved method of press-forming glass articles in the same vertical plane in which the charge is delivered without moving such charge prior to the actual pressing operation.

BRIEF DESCRIPTION OF THE DRAWINGS

The various figures depict the sequential operational steps embodying the present invention.

FIG. 1 illustrates the charging of the mold member in its down position.

FIG. 2 illustrates the horizontal positionment of the plunger member below the discharge orifice and in vertical axial alignment above the then stationary mold member.

FIG. 5 illustrates the lowering of the mold member and horizontal withdrawal of the plunger member.

FIG. 6 illustrates the mold in its up or takeout position to facilitate the removal of a newly formed article.

DESCRIPTION OF THE PREFERRED EMBODIMENTS

Figure 3:
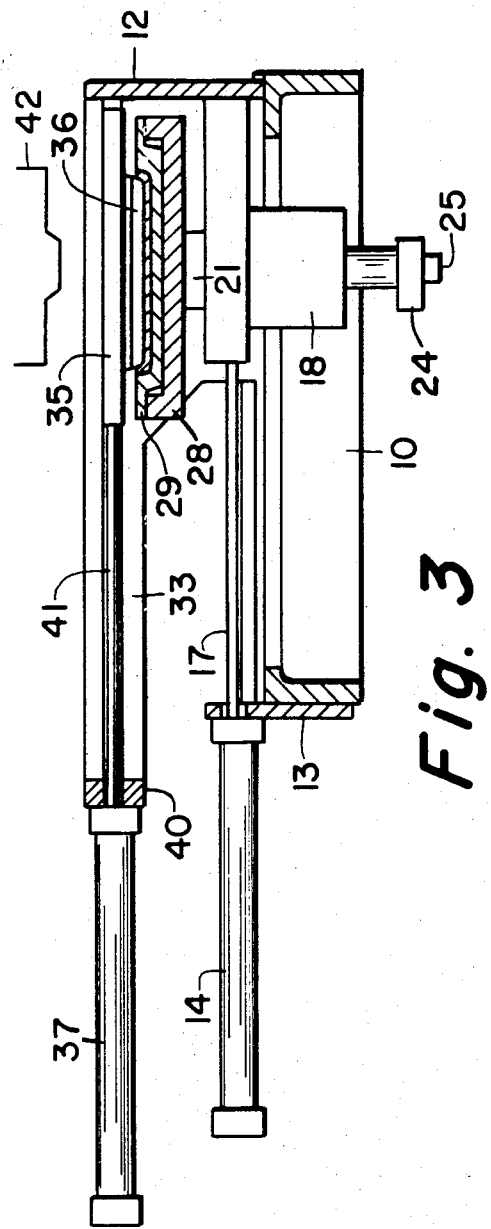
FIG. 3 illustrates the press-forming of the charge into an article between the then stationary plunger and vertically-movable mold member.

The drawings schematically illustrate one embodiment of apparatus which may be utilized to carry out the process steps of the present invention. A support or base member 10 is shown having a carriage 12 slidably positioned thereon. A bracket member 13, secured to base 10, supports a machine index cylinder 14, provided at its opposite ends with suitable fluid passages, for slidably moving the carriage 12 along slide bar portions of base 10 by means of a piston rod 17.

A combination mold index and pressing cylinder assembly 18, having suitable inlets and outlets 24, 25 is supported by carriage 12. The cylinder assembly 18 has both a pressing cylinder rod 21 and a concentric mold index cylinder rod 27 (FIG. 6) operated thereby. The upper end of mold index cylinder rod 27 is secured to a mold carrier 28 removably retaining a suitable mold 29.

The machine index carriage has an extended support frame 33 provided with a pair of slide guide grooves or recesses 34, slidably retaining a crosshead 35. The crosshead 35 has a plunger 36 secured thereto. A plunger index cylinder 37, provided at its opposite ends with suitable fluid conduits, is mounted on an end bracket 40 of the support frame 33. The plunger index cylinder 37 slides the crosshead 35 within grooves 34 by means of a piston rod 41 to operatively position plunger 36 into and out of axial alignment above the mold 29. A suitable glass feeder 42 is positioned above the base 10 to vertically-downwardly deliver a charge of molten glass 43 directly into the center of mold 29 when it is horizontally indexed in position below the feeder.

Figure 4:
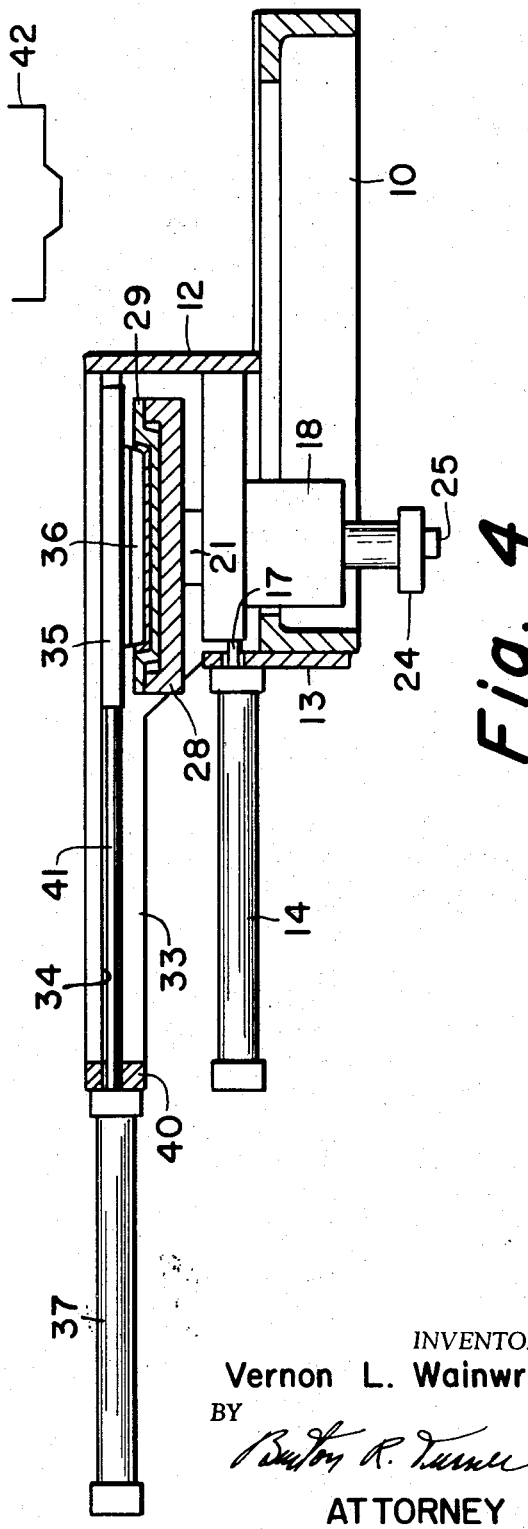
FIG. 4 illustrates the horizontal or lateral displacement in unison of the mold member and plunger while they are still in a closed position.

In operation, the mold 29 is positioned below the glass delivery orifice 42 and a charge 43 is delivered to the mold as shown in FIG. 1. Upon termination of the charge, cylinder 37 is activated to horizontally position plunger 36 in axial alignment above mold 29 while the mold and its charge are maintained stationary, as shown in FIG. 2. Cylinder assembly 18 is then activated to move the mold 29 upwardly into pressing engagement with the plunger 36 to press-form the charge 43 into an article as shown in FIG. 3. While still in a closed relationship, the plunger and mold are moved laterally in unison by means of cylinder 14 sliding the carriage 12 along the base 10, as shown in FIG. 4. The mold is then dropped downwardly by means of cylinder 18 so that the plunger 36 may be withdrawn horizontally by means of cylinder 37, as shown in FIG. 5. If desired, the cylinder 18 may then be activated to index the mold upwardly to faciiltate takeout.

From the foregoing description it can be seen that I have been able to eliminate the previously necessary upward and downward indexing of the mold for charging, and have thus been able to shorten the operating cycle sufficiently to permit the utilization of higher viscosity glasses within the range of about 600 to 2300 poises, which are easily pressed while the glasses remain within their working range to provide relatively thin lightweight pressed articles. As a specific illustration, a glass charge at a temperature of about 1210° C. with a viscosity of about 600 poises was charged into a mold positioned about two feet therebelow. The plunger was quickly moved into axial alignment above the mold while the mold remained stationary, and then the mold was moved upwardly into pressing engagement with the plunger to form a relatively thin ware article.

I claim:

1. A method of press-forming glass articles from a molten charge which comprises, laterally positioning a mold while in a down position beneath a fixed glass delivery orifice delivering a charge of molten glass into said mold while in said down position, moving a plunger into axial alignment above said mold and below said fixed delivery orifice while maintaining the mold stationary in the same down position in which said mold received the charge, and press-forming the charge between the mold and plunger by holding the plunger stationary and moving the mold to an up position in pressing engagement therewith to press-form the charge into a glass article.

2. The method as defined in claim 1 wherein the mold and plunger are moved laterally in unison while still in engagement after press-forming the article.

3. The method as defined in claim 1 wherein the mold is of sufficient distance below the orifice so as to facilitate the positionment of the plunger beneath the fixed delivery orifice and in vertical alignment above the mold.

4. The method defined in claim 1 wherein the glass viscosity may be between about 600 and 2300 poises.

References Cited
UNITED STATES PATENTS

| | | | |
|---|---|---|---|
| 3,334,985 | 8/1967 | Lippmann et al. | 65—226 |
| 3,436,202 | 4/1969 | Andrysick | 65—223 |

S. LEON BASHORE, Primary Examiner

S. R. FRIEDMAN, Assistant Examiner

U.S. Cl. X.R.
65—122, 223, 317